(No Model.)
E. E. GOLD.
THERMOSTATIC STEAM TRAP.
No. 546,846. Patented Sept. 24, 1895.
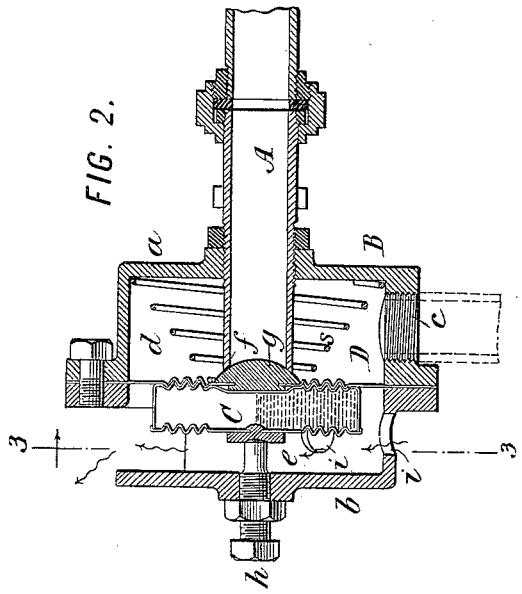
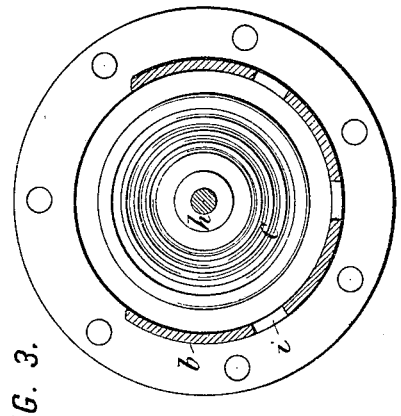
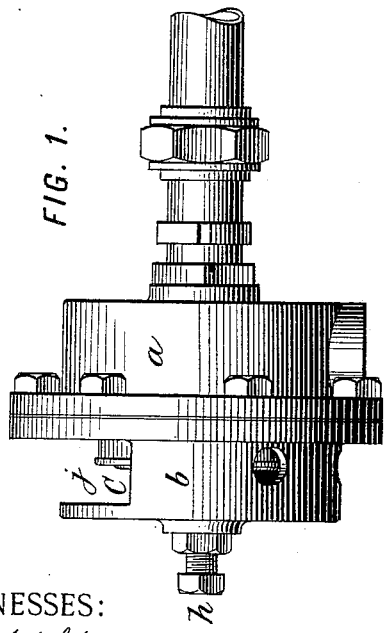
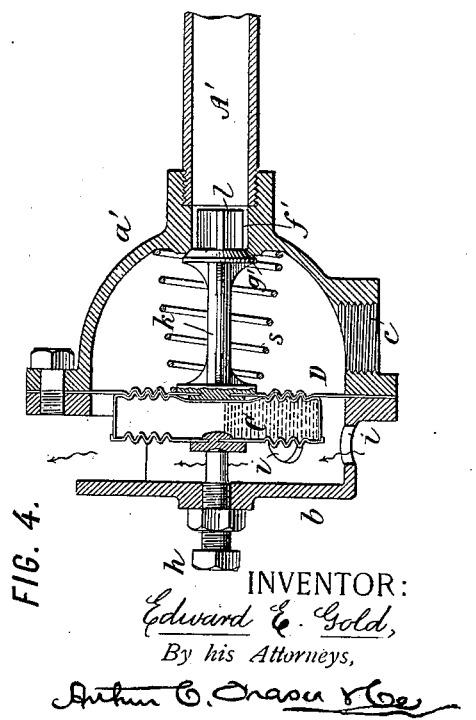
WITNESSES:
Fred White
Thomas F. Wallace
INVENTOR:
Edward E. Gold,
By his Attorneys,
Arthur E. Chaser & Co.
ANDREW B.GRAHAM. PHOTO-LITHO. WASHINGTON.D.C.

UNITED STATES PATENT OFFICE.

EDWARD E. GOLD, OF NEW YORK, N. Y.

THERMOSTATIC STEAM-TRAP.

SPECIFICATION forming part of Letters Patent No. 546,846, dated September 24, 1895.

Application filed January 29, 1895. Serial No. 536,514. (No model.)

*To all whom it may concern:*

Be it known that I, EDWARD E. GOLD, a citizen of the United States, residing in the city, county, and State of New York, have invented certain new and useful Improvements in Thermostatic Steam-Traps, of which the following is a specification.

This invention relates to traps for discharging water of condensation from steam pipes or vessels, such traps being largely used in steam-heating and other appliances.

My invention pertains to that class of traps known as "thermostatic traps"—that is to say, those in which the discharge of water is controlled by the temperature, the trap opening as the temperature falls and permitting the accumulated water to flow out; but upon being heated by the outflow of hot water or of steam the trap closes and arrests the flow. Traps operating on this principle have been made in various ways, the thermo-expansion device having in some instances been a solid part, such as a metal bar or tube, and in other instances it has been an expansion-vessel— that is to say, a closed vessel or receptacle having elastic walls and containing an expansible medium, usually a volatile liquid, which on being heated is rapidly vaporized, and the vapor by generating a pressure within the vessel expands it by bulging its walls or diaphragms outwardly, and this expansion being utilized to close the valve of the trap. Thermostatic traps of the class having such an expansible vessel as the controlling thermic device have heretofore been constructed with the expansion-vessel located in the outlet-chamber or casing of the trap in such manner that the hot water or steam on being discharged from the trap when it is open comes into direct contact with the expansion-vessel and circulates around it. This has the advantage of rapidly heating the vessel, so as to expand it and close the trap; but at the same time it has the disadvantage that in case of any rupture of the expansion-vessel it cannot be removed and replaced, because the steam constantly blowing from the trap would scald the operator, so that with such a trap there is no alternative but to permit the trap to remain in an inoperative condition until such time as the steam can be shut off to enable the trap to be repaired.

My present invention provides an improved construction of trap which is characterized, chiefly, by the interposition of a diaphragm between the steam-outlet and the expansion-vessel, so that the chamber in the trap-casing is divided into two parts, one of which serves as an outlet or escape chamber for the water or steam discharged from the trap, while the other serves for inclosing the expansion-vessel.

My invention further provides means for insuring the rapid heating of the expansion-vessel when a discharge of hot water or steam takes place, and also provides means for permitting the ready removal of the expansion-vessel and its substitution by another without opening the outlet-chamber and without shutting off the steam.

Figure 1 of the accompanying drawings is a side elevation of my improved trap in its preferred form. Fig. 2 is a longitudinal mid-section thereof. Fig. 3 is transverse section thereof on the line 3 3 in Fig. 2. Fig. 4 is a longitudinal mid-section showing a modified construction.

Referring to the drawings, let A designate the steam-outlet or drainage pipe from which the water of condensation is to be purged by the trap.

Let B designate the shell or casing of the trap. This casing is made in two parts, lettered, respectively, $a$ and $b$. The shell $a$, which is or may be made approximately cup-shaped, is that which directly connects with the pipe A. The two shells $a$ and $b$ are connected by flanges and screws or other means, and between them is introduced a flexible diaphragm D, preferably of sheet metal. This diaphragm divides the cavity within the shell or casing B into two chambers, lettered, respectively, $d$ and $e$. The chamber $d$ is that within the shell $a$, and from this chamber there opens an outlet or discharge opening $c$. The chamber $e$ is that within the shell $b$ and contains the expansion-vessel C.

In the construction shown in Fig. 2 the trap-outlet consists of the open inner end $f$ of the steam-pipe A, this pipe being prolonged within the shell $a$. This trap-outlet is closed by a valve-disk or gasket $g$, which in this construction is shown as mounted directly upon and fastened to the center of the diaphragm D. The expansion-vessel C comes directly against the diaphragm on the opposite side and when expanded by heat keeps the diaphragm pressed toward the outlet, so that the gasket *g* makes a tight fit against the outlet-opening. The adjustment of the expansion vessel is effected by a screw *h*, passing through the casing and having a set-nut, in the usual manner. As the expansion-vessel cools and contracts it ceases to support the diaphragm and permits the latter to be pressed away from the trap-outlet, so that the gasket moves out of contact with the seat or end of the steam-pipe and permits the accumulated water to flow out into the chamber *d*, whence it escapes through the discharge-opening *c*, being directed downward or discharged through any suitable pipe, such as shown in dotted lines in Fig. 2, to any suitable point of escape. As soon as hot water or steam begins to pass out its heat is communicated through the thin diaphragm D and the thin wall or diaphragm of the expansion vessel C and heats the liquid contained therein, so that it expands the vessel, and the latter again forces the diaphragm back and closes the trap-outlet.

For facilitating the opening of the trap I provide a spring *s* within the chamber *d*, which presses upon the diaphragm or upon the gasket *g* and tends to open the trap-outlet, but yields to the expansion of the vessel when the trap is closed thereby. It is desirable in traps of this character to cause the expansion-vessel to cool as rapidly as possible after each discharge, in order that it shall keep the steam pipe or vessel constantly freed from water of condensation. To this end I provide the shell *b* with openings *i i*, through which air may enter and flow through the chamber *e* past the expansion-vessel to cool the latter, as claimed in a previous patent granted to me.

Heretofore, in order to renew or replace an expansion-vessel which had become injured, it was necessary to open the trap-casing in order to gain access to its interior cavity or chamber. This necessity is obviated, according to my present invention, by the construction of the shell *b* with a large opening *j* in its top, through which the expansion-vessel can be easily withdrawn and replaced, it being only necessary to first loosen the screw *h*. This replacement of the vessel can be effected while the steam is blowing out through the trap without danger or serious inconvenience to the operator, since the diaphragm D prevents the steam from entering the chamber *e*. Hence my invention obviates the necessity which has heretofore existed of either permitting the steam to blow continuously through the trap, thereby causing a great waste of steam, or of screwing up the trap tight, so as to prevent any outflow through it and making the trap useless, so that water of condensation accumulates, or of providing a special valve or cock for temporarily closing off the trap during repairs, which has the disadvantage of being liable to be forgotten and left closed, so as to leave the trap inoperative.

In order that the expansion-vessel may be quickly heated when hot water or steam issues through the open trap, it is desirable that the expansion-vessel shall be in close and intimate contact with the diaphragm. To insure this contact, and at the same time to increase the area of contacting-surface, I form the diaphragm, and also the contiguous wall or surface of the expansion-vessel, with concentric corrugations shaped to closely fit and conform to one another, as clearly shown. These corrugations have the further advantage of retaining the expansion-vessel in a concentric position with relation to the diaphragm.

In the modification shown in Fig. 4 the sole change consists in arranging the valve-disk or gasket at a greater distance from the diaphragm. To the center of the diaphragm is attached a stem *k*, the opposite end of which carries a valve-disk or gasket *g'*, and has wings *l* entering the trap outlet or seat *f'*. This seat is not constructed as the end of the pipe A, but is formed integrally with the shell *a'*, and the steam-pipe (here lettered A') is screwed into this shell. The operation is not altered, except that by the greater distance interposed between the valve-disk or gasket and the diaphragm less heat is communicated therethrough to the expansion-vessel, which consequently is permitted to cool more rapidly, thereby causing the trap to open with greater promptitude.

I claim as my invention the following-defined novel features, substantially as hereinbefore specified, namely:

1. A trap of the described class, having a removable expansion vessel and a flexible diaphragm intervening between the outlet-opening and the expansion-vessel.

2. A trap of the described class, having a flexible diaphragm between the outlet-opening and the expansion-vessel, with a gasket mounted on the diaphragm movable thereby and seating against the outlet opening.

3. A trap of the described class, having its casing divided by a diaphragm into two chambers, with the outlet-opening discharging into one chamber and a discharge opening leading therefrom, and the expansion-vessel arranged in the other chamber.

4. A trap of the described class, having its casing divided by a diaphragm into two chambers, with the outlet-opening discharging into one chamber and the expansion-vessel arranged in the other chamber, with ventilating openings in the shell of the latter adapted to admit a circulation of air through this chamber to cool the expansion-vessel.

5. A trap of the described class, having a diaphragm between the outlet-opening and the expansion-vessel, with the latter arranged in contact with the diaphragm, and both the diaphragm and the adjoining wall of the vessel formed with interfitting corrugations whereby their surface in contact is increased.

6. A trap of the described class having a diaphragm between the outlet-opening and the expansion-vessel, said diaphragm formed with concentric circular corrugations, and the expansion-vessel formed with like corrugations, whereby the corrugations interfit when the vessel is in proper position against the diaphragm.

7. A trap of the described class having a diaphragm between the outlet-opening and the expansion-vessel, and having its casing formed with an opening adapted to admit the removal and replacement of the expansion-vessel without disturbing the casing.

In witness whereof I have hereunto signed my name in the presence of two subscribing witnesses.

EDWARD E. GOLD.

Witnesses:
ARTHUR C. FRASER,
THOMAS F. WALLACE.